United States Patent
Han et al.

(10) Patent No.: US 11,632,147 B2
(45) Date of Patent: Apr. 18, 2023

(54) SIMPLIFIED FREQUENCY-DOMAIN FILTER ADAPTATION WINDOW

(71) Applicant: Marvell Asia Pte, Ltd., Singapore (SG)

(72) Inventors: KuoRuey Han, Irvine, CA (US); Brett McClellan, Laguna Hills, CA (US); Leon Yang, Irvine, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/444,954

(22) Filed: Aug. 12, 2021

(65) Prior Publication Data

US 2022/0052725 A1    Feb. 17, 2022

Related U.S. Application Data

(60) Provisional application No. 63/065,379, filed on Aug. 13, 2020.

(51) Int. Cl.
*H04B 3/54* (2006.01)
*H04B 1/40* (2015.01)
*H04B 3/14* (2006.01)

(52) U.S. Cl.
CPC ........... *H04B 3/544* (2013.01); *H04B 1/40* (2013.01); *H04B 3/146* (2013.01); *H04B 3/546* (2013.01)

(58) Field of Classification Search
CPC ........ H04B 3/544; H04B 3/542; H04B 3/146; H04B 3/546; H04B 15/00; H04B 15/005; H04B 17/00; H04B 2215/00; H04B 3/20; H04B 3/04; H04B 3/00
See application file for complete search history.

(56) References Cited

U.S. PATENT DOCUMENTS

| | | | | |
|---|---|---|---|---|
| 4,807,173 A | * | 2/1989 | Sommen | ............ H03H 21/0027 708/321 |
| 6,859,531 B1 | * | 2/2005 | Deisher | ................ H04M 9/082 379/406.01 |
| 8,743,674 B2 | | 6/2014 | Parnaby et al. | |

(Continued)

OTHER PUBLICATIONS

Rai et al., "Convergence Analysis of LMS based Adaptive Filter," *AIP Conference Proceedings* 1324, pp. 349-351 (2010), retrievable at doi.org/10.1063/1.3526230.

*Primary Examiner* — Khanh C Tran (57) ABSTRACT

A physical layer transceiver for a data channel includes receiver circuitry configured to receive signals on the data channel, transmit circuitry configured to transmit signals onto the data channel, and adaptive filter circuitry coupled to the receiver circuitry and the transmit circuitry and configured to filter the data channel by operating on input frequency-domain data samples to output filtered data samples. The adaptive filter circuitry includes error sample generation circuitry configured to generate error samples representing a difference between a target response and the filtered data samples, arithmetic-only circuitry configured to approximate a windowing function to operate on the error samples, and output sample generation circuitry configured to operate on windowed error samples to provide the output filtered data samples. The comparison circuitry may be configured for time-domain operation and may further be configured to transform the error signals into frequency-domain error signals.

24 Claims, 6 Drawing Sheets

(56) References Cited

U.S. PATENT DOCUMENTS

| | | | |
|---|---|---|---|
| 2009/0319283 A1* | 12/2009 | Schnell | G10L 19/022 |
| | | | 704/E21.001 |
| 2010/0228810 A1* | 9/2010 | Han | H03H 21/0027 |
| | | | 375/232 |
| 2018/0219577 A1* | 8/2018 | Zhang | H04B 3/20 |
| 2018/0294894 A1* | 10/2018 | Matsubara | H04B 17/345 |
| 2021/0204043 A1* | 7/2021 | Christoph | H04R 3/007 |

* cited by examiner

FIG. 7

# SIMPLIFIED FREQUENCY-DOMAIN FILTER ADAPTATION WINDOW

CROSS REFERENCE TO RELATED APPLICATIONS

This disclosure claims the benefit of commonly-assigned U.S. Provisional Patent Application No. 63/065,379, filed Aug. 13, 2020, which is hereby incorporated by reference herein in its entirety.

FIELD OF USE

This disclosure relates to frequency-domain filters for a wireline communications channel. More particularly, this disclosure relates to implementing window-constrained frequency-domain filters using only arithmetic functions.

BACKGROUND

The background description provided herein is for the purpose of generally presenting context for the disclosure. Work of the inventors hereof, to the extent that their work is described in this background section, as well as aspects of the description that may not otherwise qualify as prior art at the time of filing, are neither expressly nor impliedly admitted to be prior art against the subject matter of the present disclosure.

Wireline communication devices such as physical layer (PHY) devices typically include filters for, e.g., echo cancellation and crosstalk cancellation (both near-end crosstalk, or NEXT, and far-end crosstalk, or FEXT). Such filters typically operate more effectively in the frequency domain, requiring complex circuitry for conversion to and from the frequency domain (such as Fast Fourier Transform, or FFT, circuitry and Inverse Fast Fourier Transform, or IFFT, circuitry). Such frequency-domain filters, particularly when filtering an entire channel, can be extremely large and consume considerable power.

SUMMARY

In accordance with implementations of the subject matter of this disclosure, a physical layer transceiver for a data channel includes receiver circuitry configured to receive signals that arrive on the data channel, transmit circuitry configured to transmit signals onto the data channel, and adaptive filter circuitry coupled to the receiver circuitry and the transmit circuitry and configured to filter the data channel by operating on input frequency-domain data samples to output filtered data samples. The adaptive filter circuitry includes error sample generation circuitry configured to generate error samples representing a difference between a target response and the filtered data samples, arithmetic-only circuitry configured to approximate a windowing function to operate on the error samples to provide windowed error samples, and output sample generation circuitry configured to operate on the windowed error samples to provide the output filtered data samples.

In a first implementation of such a physical layer transceiver, the error sample generation circuitry may include comparison circuitry configured to generate error signals representing a difference between a target response and the filtered data samples, and combining circuitry configured to combine the error signals with processed signals derived from the input frequency-domain data samples to provide the error samples.

According to a first aspect of that first implementation, the comparison circuitry may be configured for time-domain operation and may further be configured to transform the error signals into frequency-domain error signals.

In a first instance of that first aspect, the comparison circuitry may include Fast Fourier Transform circuitry configured to transform the error signals into frequency-domain error signals.

According to a second aspect of that first implementation, the combining circuitry may be configured to combine the error signals with the processed signals derived from the input frequency-domain data samples to provide samples of a gradient of a cost function to be minimized, and the arithmetic-only circuitry may be configured to approximate a windowing function to operate on the cost function gradient samples.

In a second implementation of such a physical layer transceiver, the output sample generation circuitry may include accumulator circuitry configured to generate filter coefficients from the windowed error samples output by the arithmetic-only circuitry, and output circuitry configured to combine the filter coefficients with the input frequency-domain data samples to provide the output filtered data samples.

In a third implementation of such a physical layer transceiver, the adaptive filter circuitry may operate on a portion of the data channel, and the error sample generation circuitry may be configured to generate error samples that also represent a difference between the target response and filtered data samples output by other adaptive filter circuitry operating on another portion of the data channel.

In a fourth implementation of such a physical layer transceiver, the arithmetic-only circuitry may be configured to implement a sum of sinusoidal functions.

According to a first aspect of that fourth implementation, the arithmetic-only circuitry may be configured to approximate a windowing function that is a square window.

In a first instance of that first aspect, the arithmetic-only circuitry may be configured to implement a sum of a first sine function and odd harmonics of the first sine function.

In a first variant of that first instance, the arithmetic-only circuitry may include, for the first sine function, first multiplication circuitry configured to multiply the error samples by a first constant. The arithmetic-only circuitry may further include, for each respective odd harmonic of the first sine function, respective additional multiplication circuitry configured to multiply the error samples by a respective complex constant, respective first circular shifting circuitry configured to circularly shift output of the respective additional multiplication circuitry in a first direction, and respective second circular shifting circuitry configured to circularly shift output of the respective additional multiplication circuitry in a second direction opposite the first direction. The arithmetic-only circuitry may further include vector summing circuitry configured to performed a signed summing operation on outputs of the first multiplication circuitry, the respective first circular shifting circuitry and the respective second circular shifting circuitry.

According to that variant, the respective first circular shifting circuitry may be configured to circularly shift the output of the respective additional multiplication circuitry in the first direction by a shifting amount, and the respective second circular shifting circuitry may be configured to circularly shift the output of the respective additional multiplication circuitry in the second direction by the shifting amount.

In a fifth implementation of such a physical layer transceiver, the output sample generation circuitry may further be configured to transform the output filtered data samples into time-domain output filtered data samples.

According to a first aspect of that fifth implementation, the output sample generation circuitry may include Inverse Fast Fourier Transform circuitry configured to transform the output filtered data samples into time-domain output filtered data samples.

In accordance with implementations of the subject matter of this disclosure, a method of adaptively filtering signals on a data channel, by operating on input frequency-domain data samples to output filtered data samples, includes comparing a target response and the filtered data samples to generate error samples representing a difference between the target response and the filtered data samples, approximating, using only arithmetic functions, a windowing function to operate on the error samples to provide windowed error samples, and operating on the windowed error samples to provide the output filtered data samples.

In a first implementation of such a method, comparing the target response and the filtered data samples, to generate the error samples representing a difference between the target response and the filtered data samples, may include processing the error samples to provide samples of a gradient of a cost function to be minimized, and the approximating may include approximating, using only arithmetic functions, a windowing function to operate on the cost function gradient samples.

In a second implementation of such a method, operating on the windowed error samples to provide the output filtered data samples may include accumulating the windowed error samples to generate filter coefficients, and combining the filter coefficients with the input frequency-domain data samples to provide the output filtered data samples.

In a third implementation, the method may operate on portions of the data channel, and for each portion, the comparing may generate error signals that also represent a difference between the target response and filtered data samples output by operation of the method on another portion of the data channel.

In a fourth implementation of such a method, the approximating may include using only frequency-domain arithmetic functions to implement a sum of time-domain sinusoidal functions.

According to first aspect of that fourth implementation, the approximating may include using only frequency-domain arithmetic functions to approximate a square window function.

In a first instance of that first aspect, the approximating may include using only frequency-domain arithmetic functions to implement a sum of a first time-domain sine function and odd harmonics of the first time-domain sine function.

In a first variant of that first instance, the approximating may include, for the first time-domain sine function, multiplying the combined samples in the frequency domain by a first constant. The approximating may further include, for each respective odd harmonic of the first time-domain sine function, multiplying the error samples by a respective complex constant, circularly shifting, in a first direction, a respective output of multiplying the error samples by a respective complex constant, and circularly shifting, in a second direction opposite the first direction, a respective output of multiplying the error samples by a respective complex constant. The approximating may further include performing a signed summing operation on outputs of (1) the multiplying the error samples by a first constant, (2) each multiplying the error samples by each respective complex constant, (3) each respective circular shifting in the first direction, and (4) each respective circular shifting in the second direction.

According to that first variant, the respective circular shifting in the first direction may include circularly shifting, in the first direction by a shifting amount, the respective output of multiplying the error samples, and the respective circular shifting in the second direction may include circularly shifting, in the second direction by the shifting amount, the respective output of multiplying the error samples.

In a fifth implementation of such a method, the comparing may be performed as a time-domain operation, and the method may further include transforming the error samples into frequency-domain error samples.

According to a first aspect of that fifth implementation, transforming the error samples into frequency-domain error samples comprises a Fast Fourier Transform operation.

A sixth implementation of such a method may further include transforming the output filtered data samples into time-domain output filtered data samples.

According to a first aspect of that sixth implementation, transforming the output filtered data samples into time-domain output filtered data samples may include an Inverse Fast Fourier Transform operation.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As noted above, wireline communication devices such as physical layer (PHY) devices typically include filters for, e.g., echo cancellation and crosstalk cancellation (both near-end crosstalk, or NEXT, and far-end crosstalk, or FEXT). Such filters may operate more effectively in the frequency domain, but typically require complex circuitry for conversion to and from the frequency domain, such as Fast Fourier Transform (FFT) circuitry and Inverse Fast Fourier Transform (IFFT) circuitry. Such filters, particularly when filtering an entire channel, can be extremely large and consume considerable power.

Typically, such filters may involve comparing the filter outputs to a target response and generating an error signal representing the difference between the filter outputs and the target response. That error signal is typically transformed, as by a Fast Fourier Transform, into the frequency domain, where it is combined with a frequency domain input sample vector. Specifically, in an implementation, the error signal is convolved (e.g., by multiplication) with the conjugate transpose of input frequency domain samples to form the gradient of a least-mean-squares cost function. The cost function gradient signals are run through a windowing function such as a square window, which may be implemented, where the input is a vector, as a matrix, half of which is an identity matrix and half of which is all zeroes. The matrix operation is performed in the time domain, which requires transforming the cost function gradient signals back to the time domain (e.g., by Inverse Fast Fourier Transform), and then after applying the windowing matrix, transforming the windowed signals back to the frequency domain (e.g., by another Fast Fourier Transform). The results are integrated and used as coefficients and applied (e.g., by multiplication) to the input samples to yield the output samples. Those samples are converted back to the time domain (e.g., by Inverse Fast Fourier Transform).

For efficient implementation and to reduce processing latency, the channel may be broken down into different domains or partitions that operate in parallel. In any one partition, the outputs of other partitions may be used as part of the comparison with the target response. Partitioning also reduces the length of any individual filter, which reduces size and power requirements, and reduces the latency of the total filter. However, even in a typical partitioned filter, the typical windowing operation requires a complex matrix operation, preceded by an Inverse Fast Fourier Transform and followed by a Fast Fourier Transform. These operations still require significant device area and power.

Therefore, in accordance with implementations of the subject matter of this disclosure, a filter, which may be a least-mean-squares adapted filter such as, in particular, a partitioned frequency-domain block least-mean-squares (PFBLMS) filter may be implemented using only arithmetic operations as defined herein—i.e., addition, subtraction, multiplication, division, and shifting (as opposed to complex matrix operations such as Fast Fourier Transform and Inverse Fast Fourier Transform) to approximate the windowing function. These implementations thereby provide a substantial savings in device area and power consumption.

For example, a typical PFBLMS filter may include a windowing function implemented as the matrix [I 0]—i.e., half of the matrix is an identity matrix, and the other half is all zeroes—preceded by an IFFT and followed by an FFT. The [I 0] matrix is effectively a square window operator, passing all samples in the first half of its range and blocking all samples in the second half of its range. Because a square wave is a superposition of sine functions, implementations of the subject matter of this disclosure instantiate a square-window-type PFBLMS filter using multipliers, shifters and a vector summer to approximate a square window using a sum of sine waves. However, other filters may also be constructed using only arithmetic functions, as determined using linear programming or quadratic programming techniques, to approximate other filter profiles as sums/differences of sinusoidal functions (i.e., sines and cosines) or other functions.

The subject matter of this disclosure may be better understood by reference to FIGS. 1-7.

Implementations of the subject matter of this disclosure may be found in the physical layer transceiver (PHY) of fixed, or "enterprise," Ethernet links, or in automotive or other wireless Ethernet links.

Figure 1:
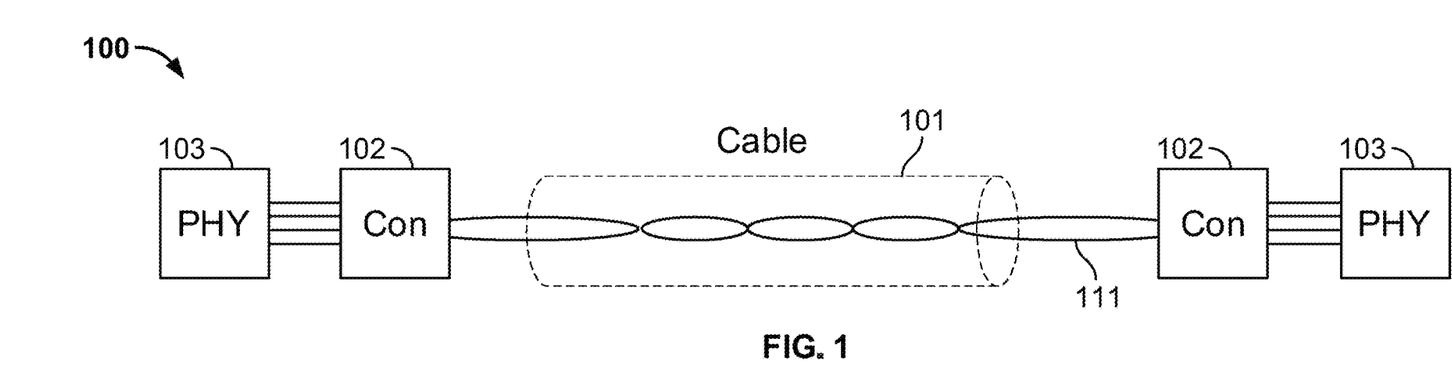
FIG. 1 shows a portion of a communication link in which implementations of the subject matter of this disclosure may be used.

A single-cable Ethernet physical link 100 in which an implementation of the subject matter of this disclosure may be used is shown in FIG. 1, connecting two physical layer transceivers 103. Each PHY 103 is connected via a respective connector 102 to channel medium 101 which, in this implementation, may be a cable including a single shielded or unshielded twisted copper wire pair 111, or a coaxial cable. Such a single-cable physical link 100 may be used, for example, in an automotive implementation, in which one of PHYs 103 may be located in an electronic control unit (ECU) of a vehicle, and another PHY 103 may be located in a functional module of the vehicle.

Figure 2:
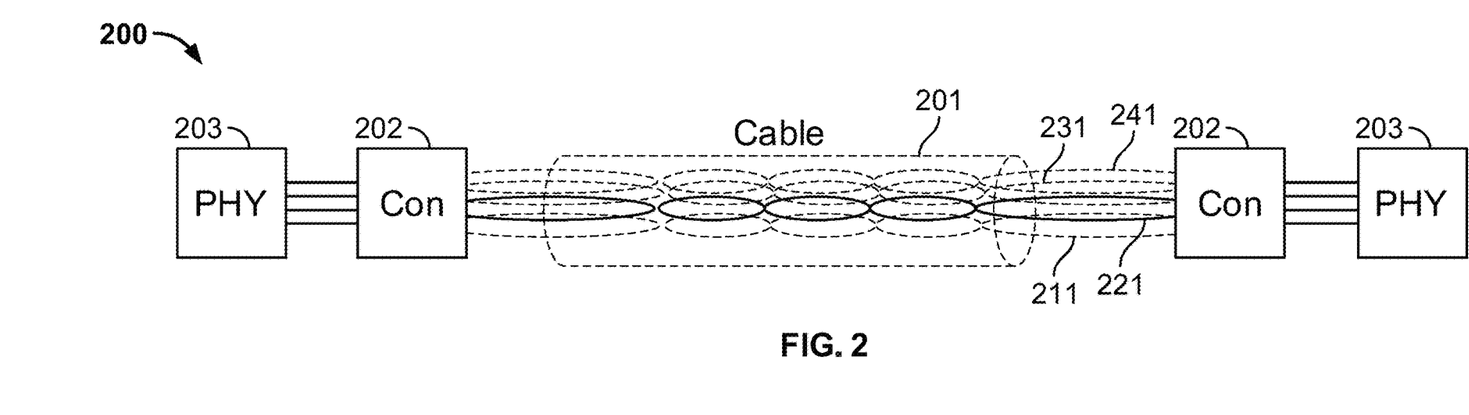
FIG. 2 shows a portion of another type of communication link in which implementations of the subject matter of this disclosure may be used.

Single-cable physical link 100 also may be used in enterprise implementations. However, in other implementations of the subject matter of this disclosure, an enterprise Ethernet physical link 200 as shown in FIG. 2 may connect two physical layer transceivers 203 corresponding to respective link partners, each of which may be located in a respective data processing or storage device. Each PHY 203 is connected via a respective connector 202 to channel medium 201 which, in this implementation, is a cable that may include four shielded or unshielded twisted copper wire pairs 211, 221, 231, 241, or four coaxial cables or optical fibers, or a mix thereof.

From the perspective of this disclosure, PHYs 103 (for a single-pair implementation) and PHYs 203 (for a multiple-pair implementation) are identical in relevant respects. An implementation of a PHY 302, shown in FIG. 3, may be used as either PHY 103 or PHY 203, for example.

Figure 3:
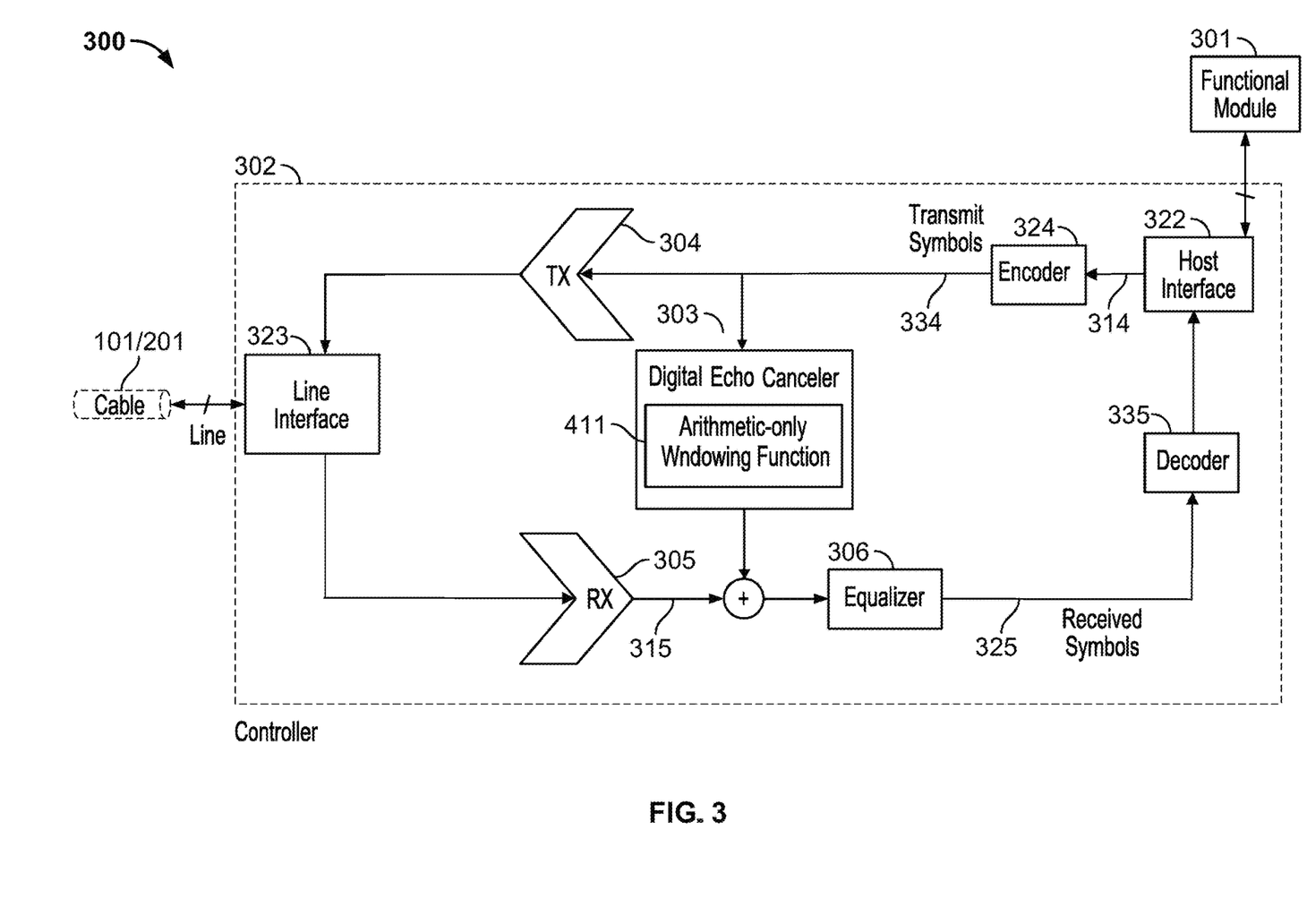
FIG. 3 shows details of a physical layer transceiver incorporating an implementation of the subject matter of this disclosure.

In a system 300 of FIG. 3, PHY 302 couples a host device, such as functional module 301, which, for example, may be a data processing or storage module of an enterprise system, or, in another example, may be an automotive module in an automotive implementation, to wireline channel medium (cable) 101/201. Host interface 322 of PHY 302 couples PHY 302 to functional module 301. In a transmit direction, signals 314 from functional module 301 pass through encoder 324 and are sent as transmitted symbols 334 to transmitter 304 and line interface 323, which couples PHY 302 to wireline channel medium (cable) 101/201. In a receive direction, signals from wireline channel medium (cable) 101/201 pass through line interface 323 to receiver 305 and thence to equalizer 306 which is used to enhance the quality of the received signal 315. Received symbols 325 then pass through decoder 335 to host interface 322 and thence to functional module 301.

One or more of adaptive filters, shown as echo canceller(s) 303, but also potentially including NEXT canceller(s) and FEXT canceller(s), filter the effects of interference from echo and/or near-end crosstalk and/or far-end crosstalk, respectively, between the transmitted symbols 334 and the received signal 315.

In some implementations according to the subject matter of this disclosure, PHY 302 transmits data from functional module 301 through host interface 322 and transmitter 304 via and line interface 322 onto wireline channel medium (cable) 101/201, and receives from wireline channel medium (cable) 101/201, via line interface 323 and receiver 305 a remote (target) signal and an echo of the transmitted signal, which are processed through adaptive filter circuitry that may include digital echo canceler 303 and/or equalizer 306. Digital echo canceler 303 may be used to remove the echo, and may also include NEXT canceler(s) and FEXT canceler(s), to filter the effects of interference from echo and/or near-end crosstalk and/or far-end crosstalk, respectively. Equalizer 306 is used to enhance the quality of the remote signal.

Figure 4:
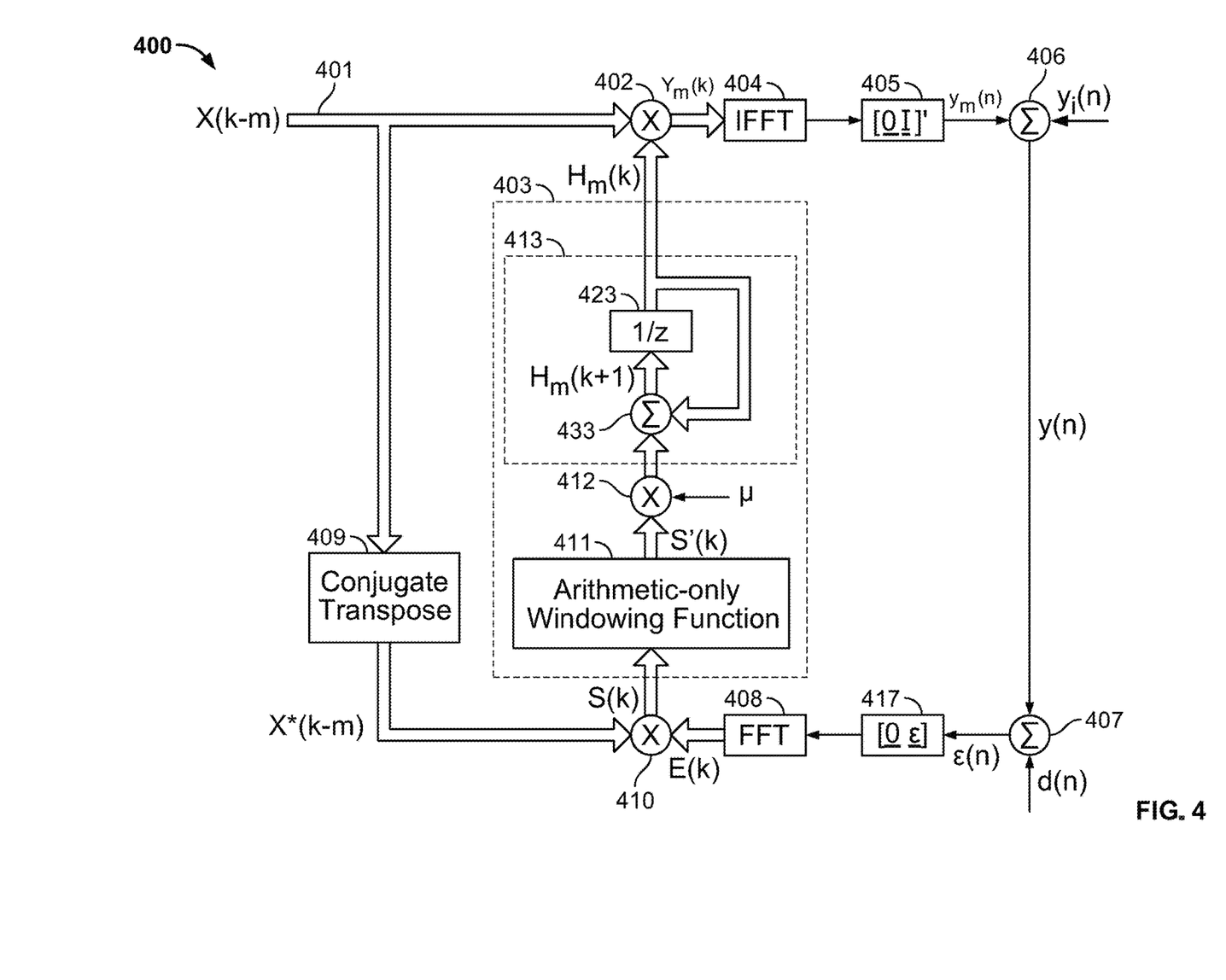
FIG. 4 is a functional representation of circuitry in the physical layer transceiver of FIG. 3 incorporating an implementation of the subject matter of this disclosure.

FIG. 4 is a functional representation 400, in accordance with implementations of the subject matter of this disclosure, of operations to implement a least-mean-square adapted filter, which may be included in digital echo canceler 303 or other filter circuitry (which may include equalizer 306), such as that described in commonly-assigned U.S. Pat. No. 8,743,674, which is hereby incorporated by reference in its entirety. Filter circuitry 400 is the mth partition of a filter including m partitions, but the structure of filter 400 may be used as a standalone filter for echo cancellation or other filter functions. Moreover, while the filter circuitry represented in FIG. 4 has been described up to this point as being part of a physical layer transceiver, implementations of the subject matter of this disclosure may be used for window functions in other types of adaptive filters.

In functional representation 400, input samples X(k−m) from one of k blocks processed in the mth partition are input at 401. Input samples X(k−m) are multiplied at 402 by coefficients $H_m(k)$ generated by cost-function minimization block 403 to provide output samples $Y_m(k)$. Input samples X(k−m) and output samples $Y_m(k)$ are in the frequency domain, and IFFT 404 transforms output samples $Y_m(k)$ back to the time domain. A square-wave filter 405 implemented as a matrix [0 I]' passes only the second half of the matrix of output samples to eliminate circular convolution artifacts of the FFT fast convolution implementation, yielding time-domain output samples $Y_m(n)$. In a partitioned implementation, output samples $Y_m(n)$ from the mth partition are combined at 406 with output samples from other partitions to provide a complete output vector y(n). Output vector y(n) is compared to a target response vector d(n) at 407 to yield error samples ε(n) which are concatenated with a [0] matrix to form [0 ε] matrix 417 and converted to frequency-domain error samples E(k) by FFT 408.

The conjugate transpose X*(k−m) of input sample vector X(k−m) is taken at 409 and combined at 410 with frequency-domain error samples E(k) to yield the cost function gradient samples S(k) to be minimized. Samples S(k) are input to arithmetic window constraint circuitry 411, implementing an arithmetic-only windowing function, in accordance with implementations of the subject matter of this disclosure. Adaptation coefficient μ of the least-squares adaptation is applied to the output S'(k) of arithmetic window constraint circuitry 411 at 412 and the results are accumulated at 413 (using, e.g., register 423 and adder 433) to yield frequency-domain coefficient vector $H_m(k)$.

Figure 5:
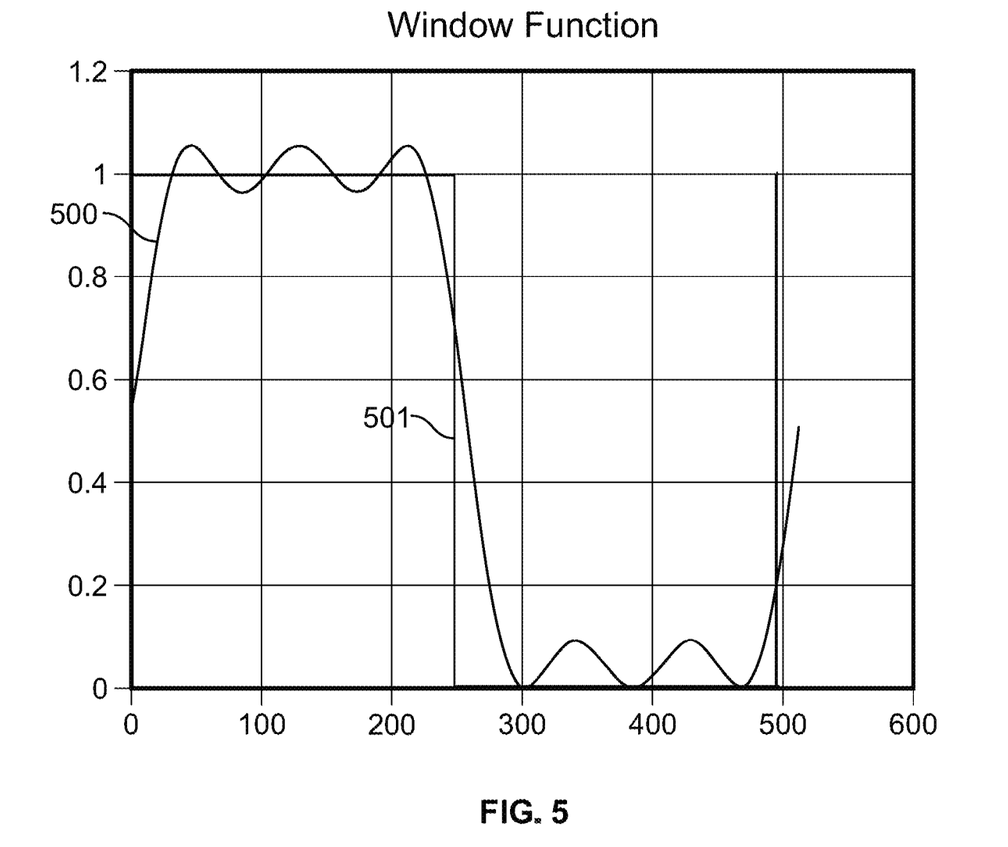
FIG. 5 is a graphical representation of the superposition of a sine function and its first three odd harmonics based on a raised Fourier series expansion.

As noted above, arithmetic window constraint circuitry 411 implements an approximation of a desired filter function, using only arithmetic functions as described above, without complex matrix or transform operations. For example, if the desired filter function is a square window, a square window may be approximated by a superposition of sinusoidal functions. FIG. 5 shows an example of the representation of a square window 501 by the superposition 500 of a sine function and its first three odd harmonics by a raised Fourier series expansion. The Fourier series expansion of a square wave window function is $$Sq(x) = c(0)1(x) + \Sigma_{n=1,3,5,\ldots} c(n)\sin(\pi/Lnx)$$

where 1(x) represents a DC offset. In the example implementation of FIG. 5, only the sine function is used because Sq(x) is an odd function. In some implementations, other sinusoidal functions may be used. In the example implementation of FIG. 5, only odd harmonics are used because Sq(x) is anti-symmetric with respect to a half-period. In other implementations, that constraint may be removed to accommodate a weighting function. In still other implementations, other combinations of harmonics may be used.

Figure 6:
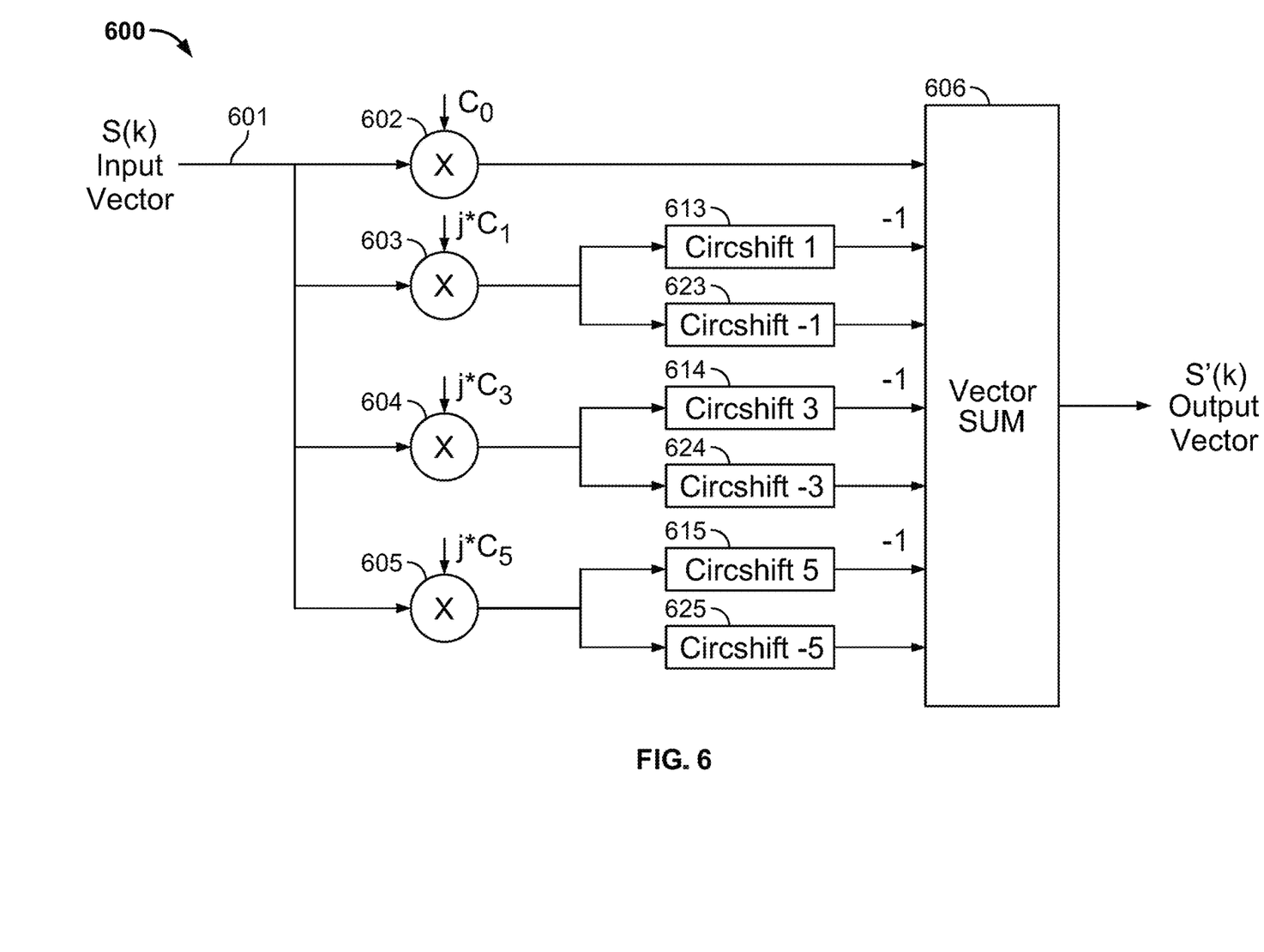
FIG. 6 is a functional representation of circuitry in accordance with an implementation of the subject matter of this disclosure for performing the superposition of FIG. 5.

Such a superposition of time-domain sine functions may be implemented in the frequency domain by representing the sine functions as impulse or delta functions in the frequency domain using, for example, operations illustrated by functional representation 600 of FIG. 6, which contains only circuitry for performing arithmetic functions. Samples S(k) are input at 601 and are multiplied at 602 by a first coefficient $c_0$. At 603, samples S(k) are multiplied by a second coefficient $c_1 \times j$, and at 613, the output of multiplier 603 is circularly shifted by one position in a first direction, and at 623, the output of multiplier 603 is circularly shifted by one position in a second direction, opposite the first direction. At 604, samples S(k) are multiplied by a second coefficient $c_3 \times j$, and at 614, the output of multiplier 604 is circularly shifted by three positions in the first direction, and at 624, the output of multiplier 604 is circularly shifted by three positions in the second direction. At 605, samples S(k) are multiplied by a third coefficient $c_5 \times j$, and at 615, the output of multiplier 605 is circularly shifted by five positions in the first direction, and at 625, the output of multiplier 605 is circularly shifted by five positions in the second direction.

Circular shifts 613, 614, 615, 623, 624, 625 in the frequency domain are frequency domain convolutions with unit responses which replace the windowing operation in the time domain. Therefore, these circular shifts allow what would be a window function in the time domain to be implemented in the frequency domain directly without complex operations. The number of shifts is dependent on the harmonic used in the approximation. The example in circuitry 600 is an approximation with three odd sine harmonics. Therefore, the shifts correspond to the first three odd harmonics—1, 3 and 5. In other implementations, more or fewer harmonics may be used, depending on the desired convergence speed of the approximation, and/or the precision and accuracy needs of the system.

Vector summer 606 performs a signed summation operation on the outputs of multiplier 602 and circular shifters 613, 623, 614, 624, 615 and 625. The summation operation is signed in that some of the inputs (circular shifters 613, 614, 615) are subtracted from, rather than added to, the total. The output of vector summer 606 is the vector S'(k).

In the function implemented in FIG. 6, the coefficients are real constants that may be combinations of negative powers of 2, such as $c_0 = c_1 = 2^{-1} = 0.5$, $c_3 = 2^{-3} = 0.125$, $c_5 = 2^{-5} = 0.3125$, to avoid large multiplication operations with minimal approximation loss, to implement a sine function. Because the window function (in this example, the square wave) represents the gradient function in the time domain, it should be positive semi-definite (i.e., represented by a Hermitian matrix with positive eigenvalues). The raised Fourier series expansion coefficients ensure that the positive semi-definite property is held.

Approximations of other functions may be implemented. The various approximations may be derived, for example, using linear programming techniques or quadratic programming techniques. The terms of the arithmetic functions may be based on a series expansion of the desired function. With enough terms, a filter based on such an expansion can be expected to perform similarly to the actual desired function.

For approximations with more terms, the Gibbs phenomenon will impact the approximation of the corner discontinuity of the square function. Using a sigma approximation to modify the Fourier series coefficients reduces the effect of the Gibbs phenomenon. For example, the sigma approximation of a Fourier series for the square wave would be $$wdw(x) = \frac{a_o}{2} + \sum_{k=1}^{m-1} \text{sinc}\left(\frac{k}{m}\right) * b_k * \sin\frac{\pi * k}{L * x}$$

where the coefficients are
$a_0=1$ and $b_k=2/k*\pi$.

The coefficients should still be approximated by raised series to maintain the positive semi-definite property.

A window-constrained PFBLMS filter according to implementations of the subject matter of this disclosure includes both an unconstrained PFBLMS filter and a constrained PFBLMS filter as special cases. For example, the window function according to implementations of the subject matter of this disclosure can approximate either the constrained square window [ones(L,1);zeros(L,1)] or the unconstrained window [ounes(2*L,1)], where L is the block size. Because the average adaptation coefficient μ is larger for an unconstrained window, the unconstrained PFBLMS filter converges faster than the constrained PFBLMS filter. Thus, an unconstrained window function can be approximated by just the $0^{th}$-order Fourier series because of its initial rapid convergence. The behavior of a sinusoidal window function according to implementations of the subject matter of this disclosure will be somewhat between the behavior of a constrained window function and an unconstrained window function, because the average p is in between the unconstrained case and the constrained case.

Figure 7:
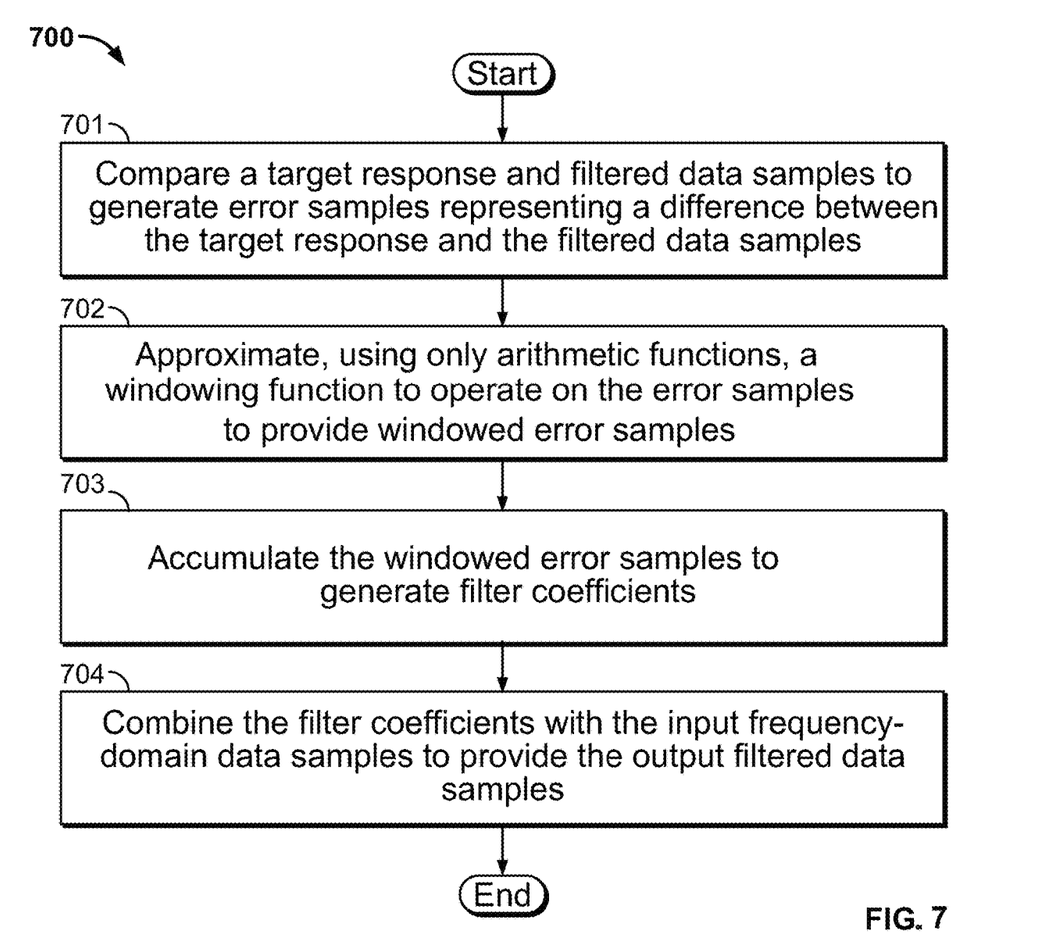
FIG. 7 is a flow diagram illustrating a method according to implementations of the subject matter of this disclosure.

FIG. 7 is a flow diagram illustrating a method 700 according to implementations of this disclosure for performing a filtering operation as described above.

At 701, a target response and filtered data samples are compared to generate error samples representing a difference between the target response and the filtered data samples. At 702, using only arithmetic functions, a windowing function operating on the error samples (which may be cost function gradient samples as described above) is approximated. At 703, outputs of the arithmetic functions (windowed error samples) are accumulated to generate filter coefficients. At 704, the filter coefficients are combined with the input frequency-domain data samples to provide the output filtered data samples.

Thus it is seen that window-constrained frequency-domain filters using only arithmetic functions for windowing have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A physical layer transceiver for a data channel, the physical layer transceiver comprising:
receiver circuitry configured to receive signals that arrive on the data channel;
transmit circuitry configured to transmit signals onto the data channel; and
adaptive filter circuitry coupled to the receiver circuitry and the transmit circuitry and configured to filter the data channel by operating on input frequency-domain data samples to output filtered data samples, the adaptive filter circuitry comprising:
error sample generation circuitry configured to generate error samples representing a difference between a target response and the filtered data samples, the error sample generation circuitry comprising:
comparison circuitry configured to generate error signals representing a difference between a target response and the filtered data samples, and
combining circuitry configured to combine the error signals with processed signals derived from the input frequency-domain data samples to provide the samples of a gradient of a cost function to be minimized;
arithmetic-only circuitry configured to approximate a windowing function to operate on the cost function gradient samples to provide windowed error samples; and
output sample generation circuitry configured to operate on the windowed error samples to provide the output filtered data samples.

2. The physical layer transceiver of claim 1 wherein:
the comparison circuitry is configured for time-domain operation and is further configured to transform the error signals into frequency-domain error signals.

3. The physical layer transceiver of claim 2 wherein the comparison circuitry comprises Fast Fourier Transform circuitry configured to transform the error signals into frequency-domain error signals.

4. The physical layer transceiver of claim 1 wherein the output sample generation circuitry comprises:
accumulator circuitry configured to generate filter coefficients from the windowed error samples output by the arithmetic-only circuitry; and
output circuitry configured to combine the filter coefficients with the input frequency-domain data samples to provide the output filtered data samples.

5. The physical layer transceiver of claim 1 wherein:
the adaptive filter circuitry operates on a portion of the data channel; and
the error sample generation circuitry is configured to generate error samples that also represent a difference between the target response and filtered data samples output by other adaptive filter circuitry operating on another portion of the data channel.

6. The physical layer transceiver of claim 1 wherein the arithmetic-only circuitry is configured to implement a sum of sinusoidal functions.

7. The physical layer transceiver of claim 6 wherein the arithmetic-only circuitry is configured to approximate a windowing function that is a square window.

8. The physical layer transceiver of claim 7 wherein the arithmetic-only circuitry is configured to implement a sum of a first sine function and odd harmonics of the first sine function.

9. The physical layer transceiver of claim 8 wherein the arithmetic-only circuitry comprises:
for the first sine function, first multiplication circuitry configured to multiply the error samples by a first constant;
for each respective odd harmonic of the first sine function:
respective additional multiplication circuitry configured to multiply the error samples by a respective complex constant,
respective first circular shifting circuitry configured to circularly shift output of the respective additional multiplication circuitry in a first direction, and respective second circular shifting circuitry configured to circularly shift output of the respective additional multiplication circuitry in a second direction opposite the first direction; and vector summing circuitry configured to performed a signed summing operation on outputs of the first multiplication circuitry, the respective first circular shifting circuitry and the respective second circular shifting circuitry.

10. The physical layer transceiver circuitry of claim 9 wherein:

the respective first circular shifting circuitry is configured to circularly shift the output of the respective additional multiplication circuitry in the first direction by a shifting amount, and the respective second circular shifting circuitry is configured to circularly shift the output of the respective additional multiplication circuitry in the second direction by the shifting amount.

11. The physical layer transceiver of claim 1 wherein the output sample generation circuitry is further configured to transform the output filtered data samples into time-domain output filtered data samples.

12. The physical layer transceiver of claim 11 wherein the output sample generation circuitry comprises Inverse Fast Fourier Transform circuitry configured to transform the output filtered data samples into time-domain output filtered data samples.

13. A method of adaptively filtering signals on a data channel by operating on input frequency-domain data samples to output filtered data samples, the method comprising:

comparing a target response and the filtered data samples to generate error samples representing a difference between the target response and the filtered data samples by processing the error samples to provide samples of a gradient of a cost function to be minimized;

approximating, using only arithmetic functions, a windowing function to operate on the cost function gradient samples to provide windowed error samples; and operating on the windowed error samples to provide the output filtered data samples.

14. The method of claim 13 wherein operating on the windowed error samples to provide the output filtered data samples comprises:

accumulating the windowed error samples to generate filter coefficients; and combining the filter coefficients with the input frequency-domain data samples to provide the output filtered data samples.

15. The method of claim 13 wherein:

the method operates on portions of the data channel; and for each portion, the comparing generates error signals that also represent a difference between the target response and filtered data samples output by operation of the method on another portion of the data channel.

16. The method claim 13 wherein the approximating comprises using only frequency-domain arithmetic functions to implement a sum of time-domain sinusoidal functions.

17. The method of claim 16 wherein the approximating comprises using only frequency-domain arithmetic functions to approximate a square window function.

18. The method of claim 17 wherein the approximating comprises using only frequency-domain arithmetic functions to implement a sum of a first time-domain sine function and odd harmonics of the first time-domain sine function.

19. The method of claim 18 wherein the approximating comprises:

for the first time-domain sine function, multiplying the combined samples in the frequency domain by a first constant;

for each respective odd harmonic of the first time-domain sine function:

multiplying the error samples by a respective complex constant, circularly shifting, in a first direction, a respective output of multiplying the error samples by a respective complex constant, and circularly shifting, in a second direction opposite the first direction, a respective output of multiplying the error samples by a respective complex constant; and performing a signed summing operation on outputs of (1) the multiplying the error samples by a first constant, (2) each multiplying the error samples by each respective complex constant, (3) each respective circular shifting in the first direction, and (4) each respective circular shifting in the second direction.

20. The method of claim 19 wherein:

the respective circular shifting in the first direction comprises circularly shifting, in the first direction by a shifting amount, the respective output of multiplying the error samples, and the respective circular shifting in the second direction comprises circularly shifting, in the second direction by the shifting amount, the respective output of multiplying the error samples.

21. The method of claim 13 wherein:

the comparing is performed as a time-domain operation; the method further comprising:

transforming the error samples into frequency domain error samples.

22. The method of claim 21 wherein transforming the error samples into frequency-domain error samples comprises a Fast Fourier Transform operation.

23. The method of claim 13 further comprising transforming the output filtered data samples into time-domain output filtered data samples.

24. The method of claim 23 wherein transforming the output filtered data samples into time-domain output filtered data samples comprises an Inverse Fast Fourier Transform operation.

* * * * *